(12) United States Patent
Werjefelt

(10) Patent No.: US 8,411,382 B2
(45) Date of Patent: Apr. 2, 2013

(54) EMERGENCY VISION APPARATUS WITH DISTRIBUTED STOWAGE SPACE

(76) Inventor: Bertil R. L. Werjefelt, Kaneohe, HI (US)

( * ) Notice: Subject to any disclaimer, the term of this patent is extended or adjusted under 35 U.S.C. 154(b) by 473 days.

(21) Appl. No.: 12/458,841

(22) Filed: Jul. 23, 2009

(65) Prior Publication Data

US 2011/0019297 A1    Jan. 27, 2011

(51) Int. Cl.
*G02B 5/00* (2006.01)
*B64D 11/00* (2006.01)

(52) U.S. Cl. ........... 359/894; 244/118.5
(58) Field of Classification Search .......... 359/894; 244/118.5

See application file for complete search history.

(56) References Cited

U.S. PATENT DOCUMENTS

| 4,573,236 A | 3/1986 | Dyson |
| 4,832,287 A | 5/1989 | Werjefelt |
| 5,083,727 A | 1/1992 | Pompei et al. |
| 5,202,796 A | 4/1993 | Werjefelt |
| 5,318,250 A | 6/1994 | Werjefelt |
| 5,947,415 A | 9/1999 | Werjefelt |
| 6,082,673 A | 7/2000 | Werjefelt |
| 6,191,899 B1 | 2/2001 | Fuchs |
| 6,460,804 B2 | 10/2002 | Werjefelt |
| 6,951,045 B2 * | 10/2005 | Thur et al. ............. 15/334 |
| 2006/0208169 A1 | 9/2006 | Breed et al. |

* cited by examiner

*Primary Examiner* — Jade R Chwasz
(74) *Attorney, Agent, or Firm* — Shlesinger, Arkwright & Garvey LLP

(57) ABSTRACT

The present invention provides an emergency vision apparatus, comprising a blower; an inflatable enclosure remote from the blower, the enclosure being made of airtight material and having an expanded form when deployed and a deflated form when not in use; first and second clear members disposed at respective first and second ends of the enclosure to enable a user to see through the enclosure when expanded and observe a source of information at a distal end of the enclosure while smoke or other particulate matter is in the environment; a switch operably associated with the blower to activate the blower and thereby inflate the enclosure when deployed; and an air passageway connecting the blower and the enclosure, the passageway being extendible from a shorter length to a longer length when the enclosure is deployed.

21 Claims, 5 Drawing Sheets

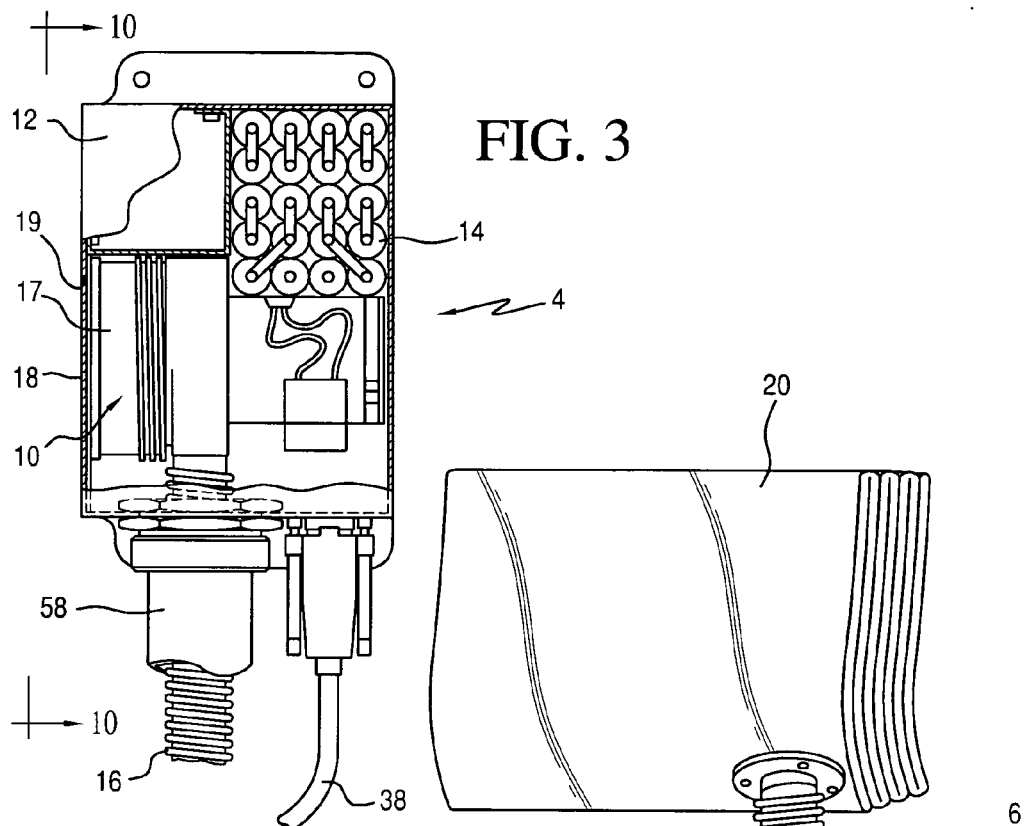
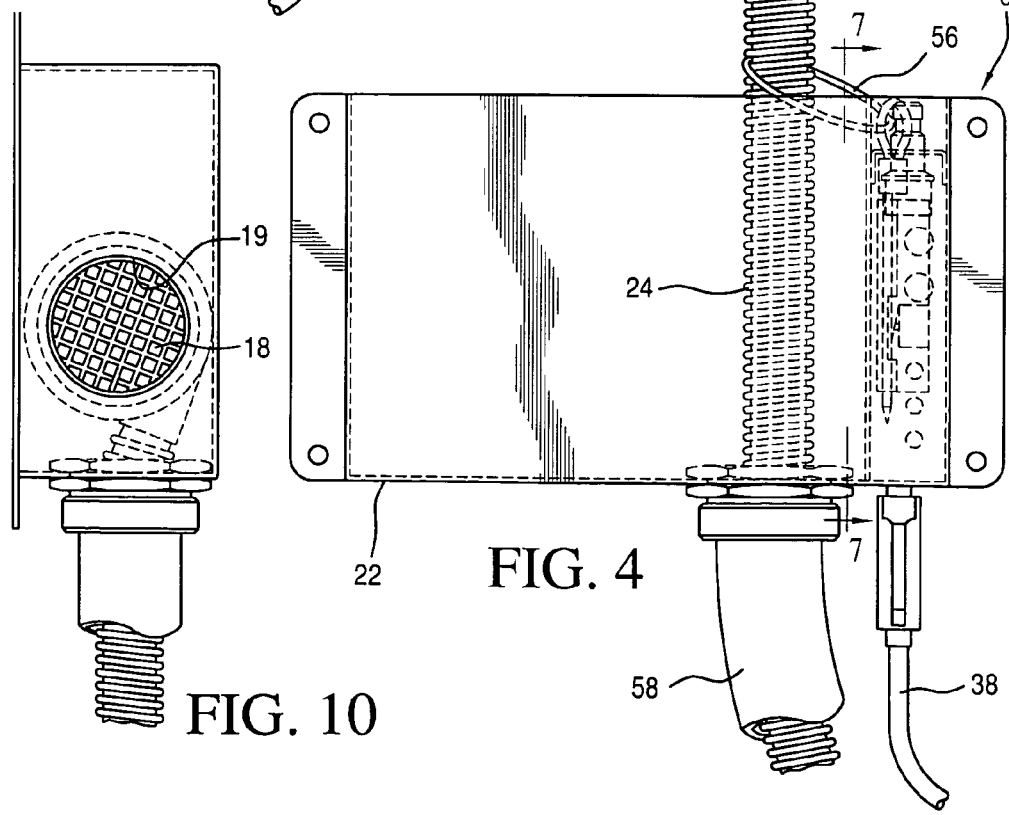

EMERGENCY VISION APPARATUS WITH DISTRIBUTED STOWAGE SPACE

FIELD OF THE INVENTION

The present invention relates generally to an apparatus to enable an operator to maintain visual contact with instruments or other visual sources of data after smoke and/or particulate from a fire or other sources has invaded the operator's environment. In particular, the present invention relates to an emergency vision apparatus that can be stowed in confined spaces, including an inflatable enclosure that bridges the gap between a pilot and the windshield and/or instrument panel of an aircraft along the pilot's line of sight and provides a clear viewing path to the windshield and/or the instrument panel, thereby providing him with vital information for guiding the aircraft to a safe landing after smoke and/or particulate matter invades the cockpit area.

BACKGROUND OF THE INVENTION

Emergency vision devices for aiding pilots to see through vision-impairing smoke to maintain their visual access to critical information, such as that provided by an instrument panel and visual information available outside the cockpit to help pilots safely guide their aircrafts are disclosed in U.S. Pat. Nos. 4,832,287; 5,318,250; 5,202,796; 5,947,415 and 6,460,804, all issued to Bertil Werjefelt.

SUMMARY OF THE INVENTION

The present invention provides an emergency vision apparatus, comprising a blower; an inflatable enclosure remote from the blower, the enclosure being made of airtight material and having an expanded form when deployed and a deflated form when not in use; first and second clear members disposed at respective first and second ends of the enclosure to enable a user to see through the enclosure when expanded and observe a source of information at a distal end of the enclosure while smoke or other particulate matter is in the environment; a switch operably associated with the blower to activate the blower and thereby inflate the enclosure when deployed; and an air passageway connecting the blower and the enclosure, the passageway being extendible from a shorter length to a longer length when the enclosure is deployed.

BRIEF DESCRIPTION OF THE DRAWINGS

FIG. 3 is rear elevational view of FIG. 2, with the rear cover removed to show the components inside.

FIG. 4 is a front elevational view of the inflatable unit of FIG. 2, showing the inflatable enclosure being pulled out from the housing.

FIG. 10 is side elevational view of the blower unit taken along line 10-10 of FIG. 3.

DETAILED DESCRIPTION OF THE INVENTION

Figure 1:
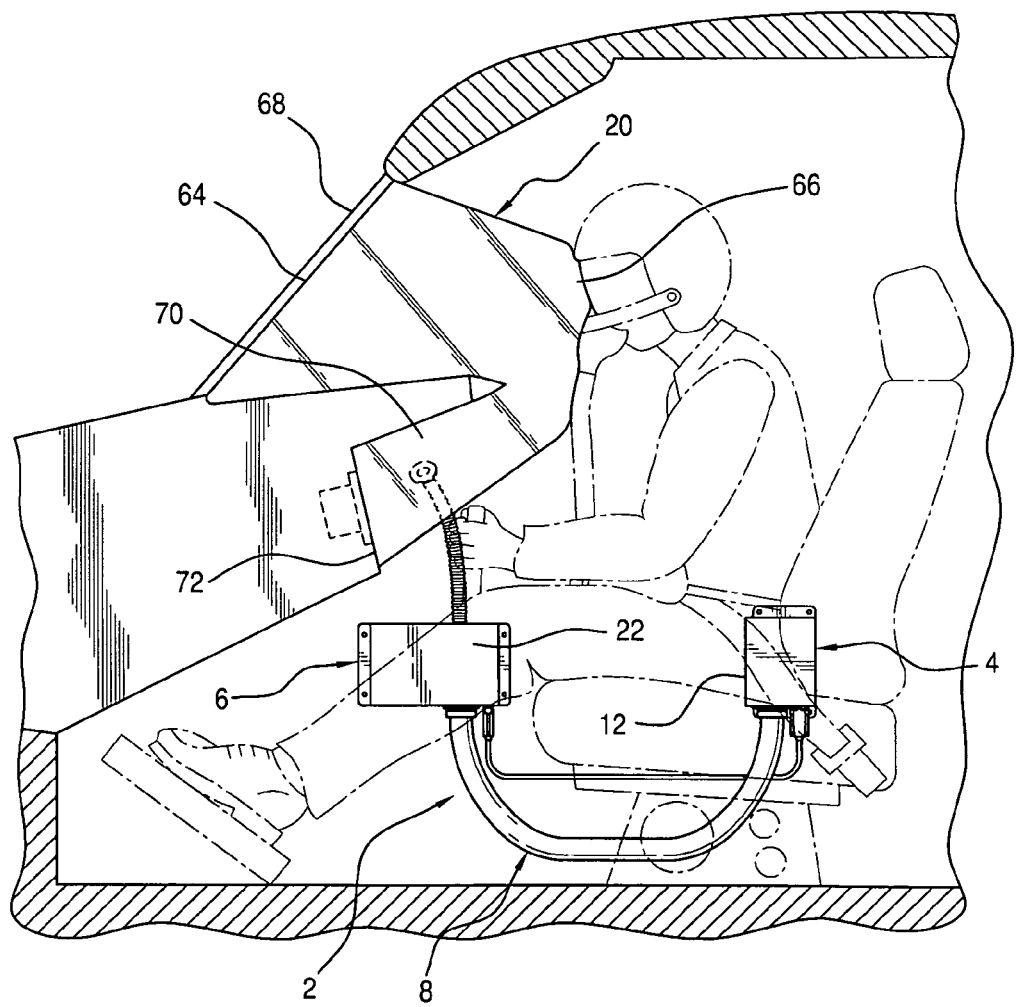
FIG. 1 is a schematic cross-sectional view of an aircraft cockpit showing an embodiment of the present invention in use.

Referring to FIG. 1, an embodiment of an emergency vision apparatus 2 made in accordance with the present invention is disclosed. The apparatus 2 includes a blower unit 4, an inflatable unit 6 and an extendible flexible hose or tubular air passageway 8 operably connecting the blower unit 4 to the inflatable unit 6. The apparatus 2 is preferably used in an area where stowage space is limited for a conventional emergency vision apparatus where the inflatable unit, the blower unit and the hose are all stowed in one housing. In the present invention, the inflatable unit 6 is advantageously stowed remotely from the blower unit 4, thereby distributing the stowage space requirement of the components from one large space-consuming package into two smaller housings, with the connecting hose laid out between the housings. For example, a standard emergency vision apparatus, shown in U.S. Pat. No. 6,082,673, has all the components, including the inflatable enclosure, blower, hose and batteries, stowed in a single housing. In the present invention, the components are stowed in separate, smaller enclosures, adapted to be fitted within a small cockpit with confined spaces.

The blower unit 4 includes a blower 10 disposed within a housing 12, as shown in FIG. 3. A battery pack 14 is operably connected to the blower 10. The passageway 8 includes a flexible inner hose 16 operably connected to the blower 10. The blower 10 includes a filter 17 that filters the particulate matter in the environment so that clear air is pumped through hose 16.

In use, the housing 12 is mounted to an existing structure, such as a wall inside a cockpit, in a vertical orientation, as shown in FIG. 1, so that the blower inlet 18 is disposed on the vertical side of the housing 12, and aligns with an opening 19 on the side of the housing 12, as shown in FIGS. 3 and 10. In this manner, collection of dusts and other particulate matter would be minimized at the inlet 18. The housing 12 may also be attached to wherever space may be found, such behind the pilot's seat, under the seat, etc.

Figure 5:
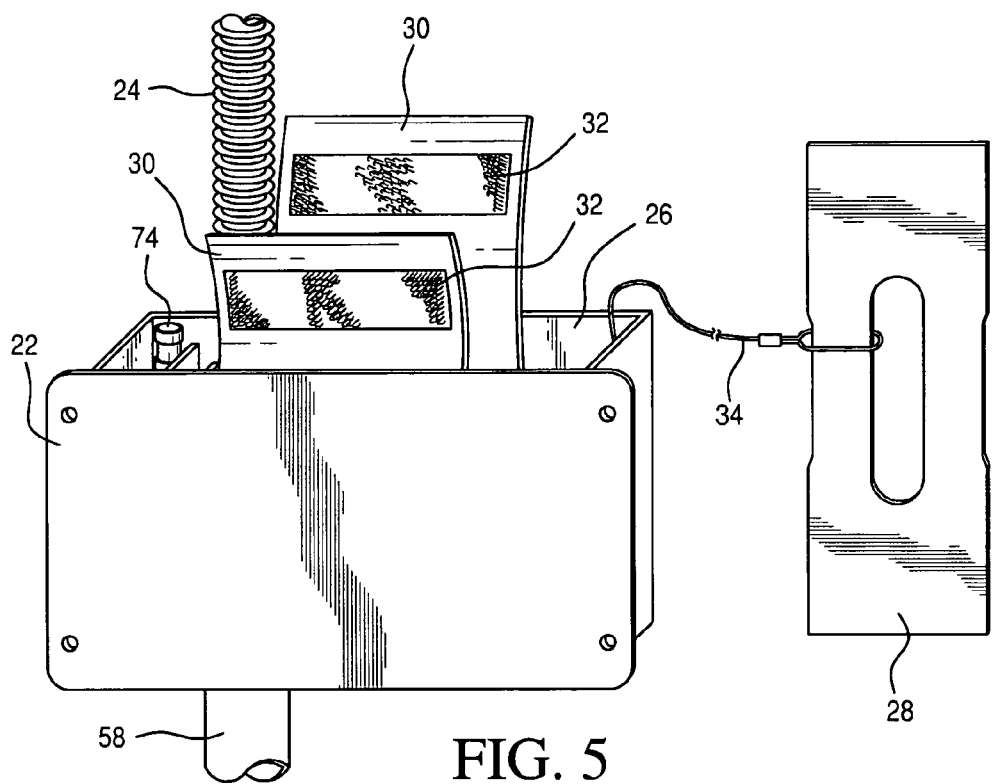
FIG. 5 is a rear perspective view of the housing for the inflatable enclosure.
Figure 6:
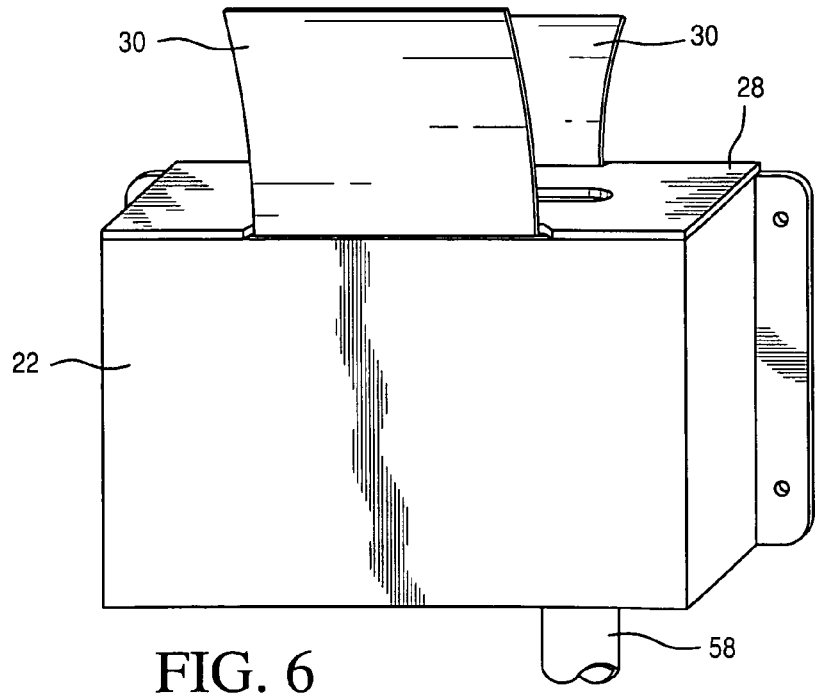
FIG. 6 is a front perspective view of the housing of FIG. 5, showing the cover in place and the straps ready to be folded down.
Figure 7:
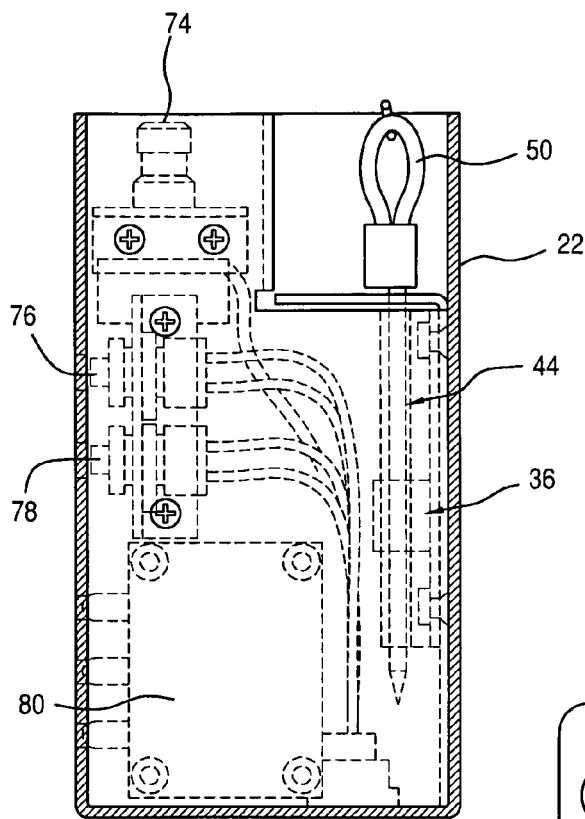
FIG. 7 is a view taken along line 7-7 of FIG. 4, showing the various switches inside the housing of the inflatable enclosure.
Figure 9:
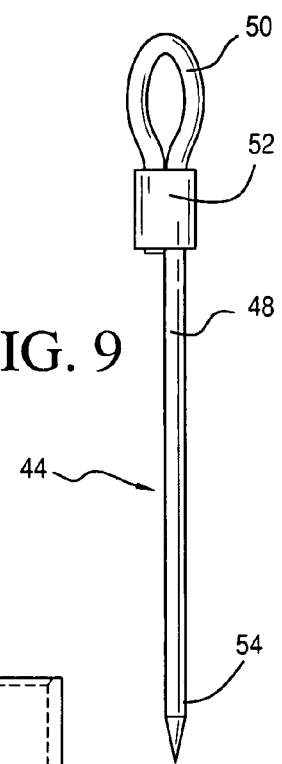
FIG. 9 is side view of the removable member used to activate the switch shown in FIG. 8.

The inflatable unit 6 includes an inflatable enclosure 20 (shown deflated) disposed in a housing 22 when not in use, as shown in FIG. 4. A flexible hose 24 is operably connected in communication with the interior space of the enclosure 20. The housing 22 has a top opening 26 to allow retrieval of the enclosure 20 during deployment, as shown in FIG. 5. A cover 28 is provided to close the opening 26. Straps 30 with VELCRO fasteners 32 are used to keep the cover 28 secured. A tie 34 is used to keep the cover 28 attached to the housing 22.

Figure 8:
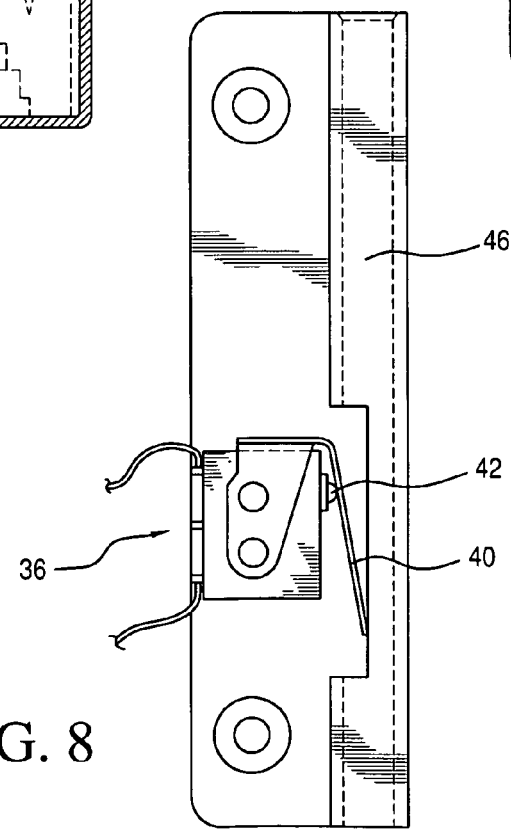
FIG. 8 is a side elevational view of the switch activated by a removable member.

The housing 22 includes a switch 36 that controls the activation of the blower 10. The switch 36 is operably connected to the blower 10 via cable 38. Referring to FIG. 8, the switch 36 has a lever 40 that depresses a button 42 to turn the switch off and releases the button 42 to turn the switch on. A removable member 44 disposed in a longitudinal guide 46 depresses the button 42 via the lever 40. When the member 44 is withdrawn from the guide 46, the lever 40 is released from depressing the button 42, thereby turning on the blower 10.

The member 44 has a shank portion 48 that is received within the guide 46 and a loop portion 50 secured to the shank portion 48 with a crimp member 52. The member 44 is preferably made of plastic, such as Nylon. The end portion 52 is preferably pointed for ease of insertion into the guide 46. Referring back to FIG. 4, the loop portion 50 is attached to the hose 24 with a tie 56 so that when the enclosure 20 is taken out of the housing 22, the member 44 is pulled out of the guide 46 at the same time, thereby releasing the lever 40 and turning on the switch 36 to activate the blower 10.

Figure 2:
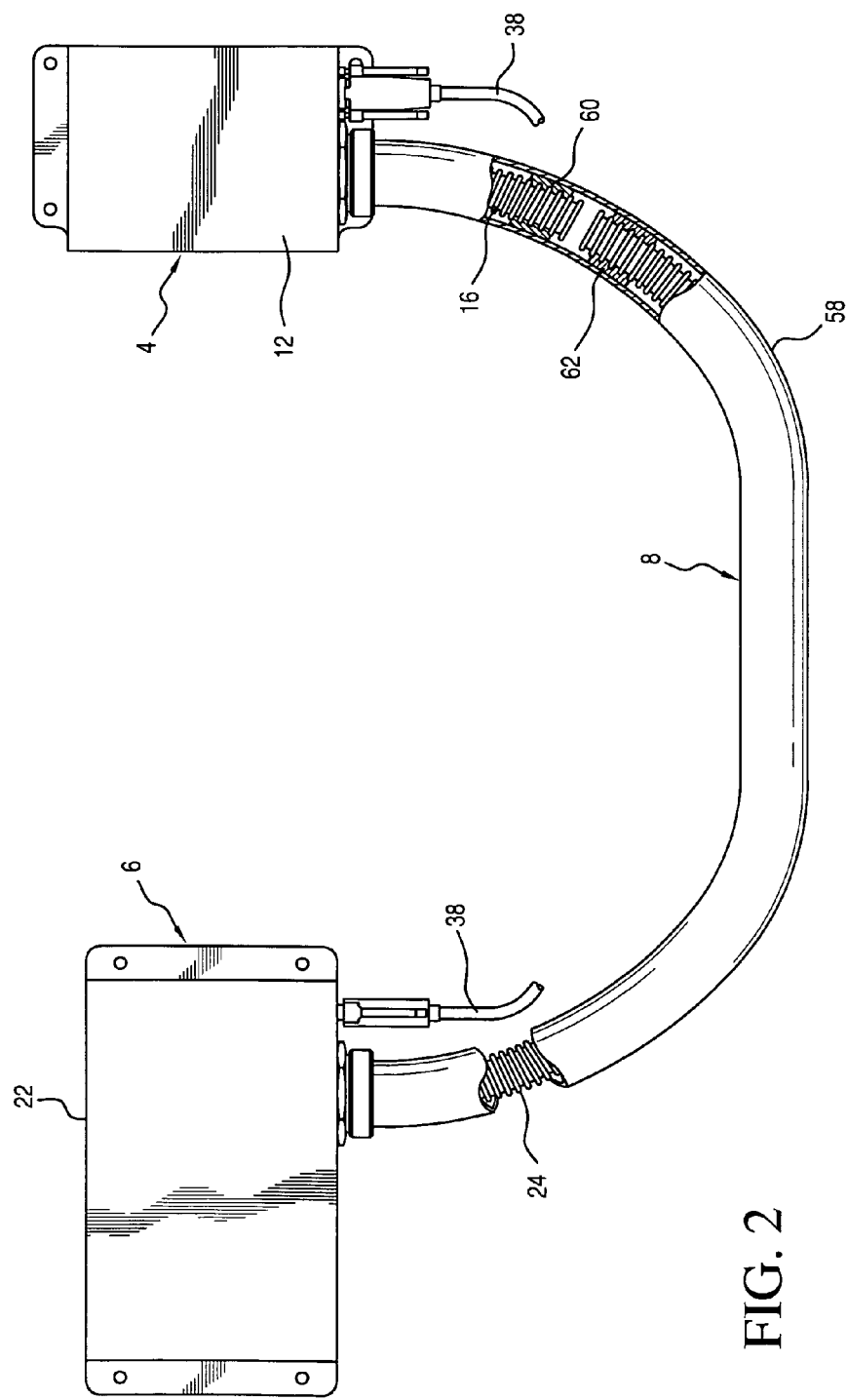
FIG. 2 is a front elevational view of an embodiment of an emergency vision apparatus shown in FIG. 1 in stowage position.

Referring back to FIG. 2, the passageway 8 includes a flexible outer hose 58 operably attached to the housing 12 and the housing 22. The inner hose 16 is disposed within the outer hose 58 and sealed thereto with seal 60. Similarly, the inner hose 24 is disposed within the outer hose 58 and sealed thereto with seal 62. The inner hose 24 is slidable within the outer hose 58 in a telescoping manner so that when the enclosure 20 is pulled out of the housing 22, the hose 24 slides outwardly from the outer hose 58, thereby extending the length of the hose from a shorter length to a longer length to allow placement of the inflated enclosure between the source of information and the user's eyes. The seal 62 is slidable along the inner surface of the outer hose 58. For greater extension of the inner hose 24, the inner hose 16 is preferably much shorter with its outer end being close to the housing 12, while the inner hose 24 is made much longer with its free end close to the free end of the inner hose 16, thereby occupying substantially the length of the outer hose 58. Although the outer hose 58 may be connected directly to the blower 10, the use of the inner hose 16 advantageously provides for flexibility in maintenance. Removal or replacement of the blower 10 is much easier with the use of the inner hose 16. The outer hose 62 is built to protect the inner hoses 16 and 24 from foot traffic abuse in case the hose 58 is laid down on the floor of the cockpit. By using a telescoping hose arrangement, the length of the air passageway between the blower unit 4 and inflatable unit 6 is advantageously adjusted from a shorter space-saving length for stowage to an extended longer length for deployment.

Referring to FIG. 1, the enclosure 20 is shown in the expanded or inflated form during use. The enclosure 20 is a standard enclosure, such one disclosed in U.S. Pat. Nos. 5,202,796, 5,947,415 and 6,082,673. The enclosure 20 is made from substantially air-tight material, which is foldable and flexible. The enclosure 20 has a clear transparent front member 64 and a clear transparent rear member 66 to allow the user to see through the enclosure to the source of information, such as through the windshield 68 of an aircraft cockpit. The enclosure 20 also includes a portion 70 that allows the user to view another source of information, such as the instrument panel in the cockpit. The portion 70 similarly includes a clear transparent front member 72 to allow the user to view the instrument panel.

The enclosure 20 starts to inflate as soon as it is taken from the housing 22 and the member 44 is withdrawn from the guide 46. The blower 10 is automatically activated by the switch 36, which is turned on by the withdrawal of the member 44. In case the switch 36 fails, a bypass switch 74 may be activated. The switch 74 is wired parallel to the switch 36 such as to be able to turn the blower 10 on even if the switch 36 fails to turn on or somehow freezes in the open position. The bypass switch 74 is advantageously within the housing 22, disposed near the top opening 26, visible and within easy reach of the operator in case it is needed.

After use, the blower 10 is turned off by replacing the member 44 into the guide 46, thereby turning off the switch 36. The tie 56 is loose enough to be moved down the inner hose 24. The enclosure 20 is then deflated, folded and placed within the housing 22.

Referring to FIG. 4, a blower test switch 76 and a battery test switch 78 are provided for maintenance purposes. The switch 76 will test the operation of the blower 10. The switch 78 will test the charge of the battery pack 14 through a standard battery tester 80.

The apparatus 2 makes possible the installation of an emergency vision apparatus where stowage space is limited. Instead of packaging the blower unit 4, the inflatable unit 6 and the connecting passageway or hose 8 in one large housing, the various units are placed in smaller housings and distributed in the limited space available. This makes the apparatus 2 available for use in smaller aircrafts with cockpits of limited and confined spaces.

It seen from the foregoing description that the apparatus 2 enables an operator to maintain visual contact with instruments or other visual sources of data after vision-obscuring matter, such as smoke and/or particulate matter from a fire, has invaded the operator's environment. In particular, the apparatus 2 provides a clear view outside the windshield and of the instrument panel in an aircraft cockpit, thereby providing the pilot with vital information for guiding the aircraft to a safe landing after such as smoke or other vision-obscuring matter, invades the cockpit area.

Although the apparatus 2 is shown in the context of an aircraft cockpit, the invention can be used in other similar environments where an operator in a station requires access to information from a source, such as an instrument panel, during a vision-obscuring emergency, such as a smoke generating event. Examples of operator stations are a submarine control station, a nuclear power plant control room, an oil rig or any other critical or military environments where the need exists for an operator to continue to operate in case of a vision-obscuring emergency, such as when smoke or other particulate matter invades the operator station and obliterates the visibility between the operator and the control panel. Accordingly, where the instruments, control panel or critical sources of information are disposed in an operator station, the operator must have visual access to the information in case a vision-obscuring event occurs in the operator station.

While this invention has been described as having preferred design, it is understood that it is capable of further modification, uses and/or adaptations following in general the principle of the invention and including such departures from the present disclosure as come within known or customary practice in the art to which the invention pertains, and as may be applied to the essential features set forth, and fall within the scope of the invention or the limits of the appended claims.

I claim:

1. An emergency vision apparatus, comprising:
a) a blower;
b) an inflatable enclosure remote from said blower, said enclosure being made of airtight material and having an expanded form when deployed and a deflated form when not in use;
c) first and second clear members disposed at respective first and second ends of said enclosure to enable a user to see through said enclosure when expanded and observe a source of information at a distal end of said enclosure while smoke or other particulate matter is in the environment;
d) a switch operably associated with said blower to activate said blower and thereby inflate said enclosure when deployed;
e) a tubular air passageway connecting said blower and said enclosure, said passageway being extendible from a shorter length for stowage to a longer length when said enclosure is deployed;

f) said passageway including an inner hose operably associated with an outer hose, said inner hose being disposed within said outer hose when said enclosure is not in use; and g) said inner hose is slidable within and extendible from said outer hose when said enclosure is deployed.

2. An emergency vision apparatus as in claim 1, and further comprising:
 a) a housing;
 b) said inflatable enclosure when in said deflated form is disposed within said housing; and
 c) said switch is attached to said housing.

3. An emergency vision apparatus as in claim 2, wherein:
 a) said switch includes a lever between a depressed position wherein said switch is off and a released position wherein said switch is on; and
 b) a removable member pressing on said lever in said depressed position and releasing said lever to said released position when said removable member is removed.

4. An emergency vision apparatus as in claim 3, wherein said removable member is operably attached to said enclosure.

5. An emergency vision apparatus as in claim 3, wherein:
 a) said inner hose is attached to said enclosure; and
 b) said removable member is attached to said inner hose.

6. An emergency vision apparatus as in claim 1, and further comprising:
 a) a housing;
 b) said enclosure when in said deflated form is disposed in said housing; and
 c) said switch is activated automatically when said enclosure is taken out of said housing for deployment.

7. An emergency vision apparatus as in claim 1, wherein said passageway is extendible from a shorter length to a longer length as said enclosure is pulled out of said housing.

8. An emergency vision apparatus as in claim 1, wherein said passageway is telescoping.

9. An emergency vision apparatus as in claim 1, wherein said inner hose is attached to said enclosure.

10. An emergency vision apparatus as in claim 1, and further comprising:
 a) a first housing for said blower and a second housing for said enclosure; and
 b) one end of said outer hose is attached to said first housing and another end of said housing is attached to said second housing.

11. An emergency vision apparatus as in claim 1, and further comprising:
 a) a housing having a vertically disposed side with an opening;
 b) said blower is disposed within said housing, said blower having an inlet; and
 c) said opening is operably associated with said inlet.

12. An emergency vision apparatus as in claim 1, further comprising:
 a) a housing having a top opening;
 b) said enclosure when in said deflated form is disposed within said housing; and
 c) a removable cover for said top opening.

13. An emergency vision apparatus, comprising:
 a) first and second housings disposed remote from each other;
 b) blower disposed in said first housing;
 c) an inflatable enclosure disposed in said second housing when stowed, said enclosure being made of airtight material and having an expanded form when deployed and a deflated form when not in use, said enclosure being disposed in said second housing when in said deflated form;
 d) first and second clear members disposed at respective first and second ends of said enclosure to enable a user to see through said enclosure when in said expanded form and observe a source of information at a distal end of said enclosure while smoke or other particulate matter is in the environment;
 e) a switch operably associated with said blower to activate said blower and thereby inflate said enclosure when deployed;
 f) an outer hose having one end connected to said first housing and in communication with said blower, said outer hose having another end connected to said second housing; and
 g) an inner hose operably associated with said outer hose, said inner hose being disposed within said outer hose when said enclosure is disposed within said second housing, said inner hose having one end connected to and communicating with said enclosure, said inner hose extending from said second housing and telescoping from said outer hose when said enclosure is pulled out of said second housing.

14. An emergency vision apparatus as in claim 13, wherein:
 a) said switch includes a lever between a depressed position wherein said switch is off and a released position wherein said switch is on; and
 b) a removable member pressing on said lever in said depressed position and releasing said lever to said released position when said removable member is removed.

15. An emergency vision apparatus as in claim 14, wherein said removable member is operably attached to said enclosure such that said member is pulled out as said enclosure is taken of said second housing.

16. An emergency vision apparatus as in claim 14, wherein a tie is secured to said member and said inner hose.

17. An emergency vision apparatus as in claim 13, and further comprising a bypass switch for said blower.

18. An emergency vision apparatus as in claim 17, wherein:
 a) said second housing includes a top opening; and
 b) said bypass switch is operable through said top opening.

19. An emergency vision apparatus as in claim 13, wherein:
 a) said second housing includes a top opening; and
 b) a cover removably secured to said top opening.

20. An emergency vision apparatus as in claim 13, wherein said switch is automatically activated when said enclosure is taken out of said housing for deployment.

21. An emergency vision apparatus as in claim 13, wherein:
 a) another inner hose is slidably disposed within said outer hose; and
 b) said another inner hose is connected to said blower.

* * * * *